US012536973B2

(12) United States Patent
Furuya

(10) Patent No.: US 12,536,973 B2
(45) Date of Patent: Jan. 27, 2026

(54) LIQUID CRYSTAL DISPLAY (LCD) APPARATUS SUPPRESSING FLUCTUATION OF RAMP VOLTAGE THEREBY REDUCING DETERIORATION OF IMAGE QUALITY

(71) Applicant: JVCKENWOOD Corporation, Yokohama (JP)

(72) Inventor: Masato Furuya, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 18/787,437

(22) Filed: Jul. 29, 2024

(65) Prior Publication Data

US 2025/0046268 A1 Feb. 6, 2025

(30) Foreign Application Priority Data

Jul. 31, 2023 (JP) ................................ 2023-124759

(51) Int. Cl.
*G09G 3/36* (2006.01)
*G09G 3/20* (2006.01)

(52) U.S. Cl.
CPC ......... *G09G 3/3688* (2013.01); *G09G 3/2007* (2013.01); *G09G 2310/0259* (2013.01); (Continued)

(58) Field of Classification Search
CPC ...... G09G 3/36; G09G 3/3611; G09G 3/3614; G09G 3/3622; G09G 3/3625; G09G 3/364; G09G 3/3644; G09G 3/3648; G09G 3/3655; G09G 3/3659; G09G 3/3666; G09G 3/3674; G09G 3/3677; G09G 3/3681; G09G 3/3685; G09G 3/3688; G09G 3/3692; (Continued)

(56) References Cited

U.S. PATENT DOCUMENTS 6,348,909 B1 * 2/2002 Kim ..................... G09G 3/2011 345/89
2001/0040548 A1 * 11/2001 Ikeda ................... G09G 3/3688 345/99

(Continued)

FOREIGN PATENT DOCUMENTS

JP 2012226381 A 11/2012

*Primary Examiner* — Ke Xiao
*Assistant Examiner* — Nelson Lam
(74) *Attorney, Agent, or Firm* — PROCOPIO, CORY, HARGREAVES & SAVITCH LLP

(57) ABSTRACT

A liquid crystal display apparatus includes: a ramp signal generation circuit configured to output shifted plurality of ramp signals; a signal processing circuit configured to add a correction value corresponding to a shift amount of an assigned ramp signal to each of a plurality of picture signals for the number of columns of the plurality of pixels; a horizontal shift register configured to sequentially capture the plurality of picture signals; a latch circuit configured to simultaneously output the plurality of picture signals; a gradation counter; a plurality of comparators configured to output a matching signal when each of the plurality of picture signals matches a count value of the gradation counter; and a switch circuit configured to output, to a pixel in a column corresponding to a comparator from which the matching signal is output, one of voltages of the plurality of ramp signals corresponding to the pixel.

4 Claims, 12 Drawing Sheets

(52) U.S. Cl.
CPC ................. *G09G 2310/027* (2013.01); *G09G 2310/0286* (2013.01); *G09G 2310/08* (2013.01); *G09G 2320/0233* (2013.01)

(58) Field of Classification Search
CPC ......... G09G 3/3696; G09G 2310/0259; G09G 2310/0286
USPC .................................................... 345/87–104
See application file for complete search history.

(56) References Cited

U.S. PATENT DOCUMENTS

| | | | | |
|---|---|---|---|---|
| 2004/0189622 | A1* | 9/2004 | Huang | G09G 3/3648 345/204 |
| 2009/0219238 | A1* | 9/2009 | Furuya | G09G 3/3677 345/87 |
| 2012/0050147 | A1* | 3/2012 | Iwasa | G09G 3/3614 345/96 |
| 2020/0327859 | A1* | 10/2020 | Uchiyama | G09G 3/3696 |
| 2021/0072608 | A1* | 3/2021 | Iwasa | G09G 3/006 |
| 2021/0074235 | A1* | 3/2021 | Iwasa | G09G 3/3696 |
| 2021/0149264 | A1* | 5/2021 | Iwasa | G02F 1/136286 |
| 2021/0295791 | A1* | 9/2021 | Iwasa | G09G 3/3648 |
| 2025/0209995 | A1* | 6/2025 | Hashikaki | G09G 3/36 |

* cited by examiner

Related Art

LIQUID CRYSTAL DISPLAY (LCD) APPARATUS SUPPRESSING FLUCTUATION OF RAMP VOLTAGE THEREBY REDUCING DETERIORATION OF IMAGE QUALITY

CROSS REFERENCE TO RELATED APPLICATION

This application is based upon and claims the benefit of priority from Japanese patent application No. 2023-124759, filed on Jul. 31, 2023, the disclosure of which is incorporated herein in its entirety by reference.

BACKGROUND

The present disclosure relates to a liquid crystal display apparatus and a method for controlling the same, and relates to a liquid crystal display apparatus suitable for reducing the deterioration of image quality and a method for controlling the same.

LCOS (Liquid Crystal on Silicon) type liquid crystal display apparatuses mounted on a projector apparatus and the like are required to have reduced deterioration of image quality. A technique related to a liquid crystal display apparatus is disclosed, for example, in Japanese Unexamined Patent Application Publication No. 2012-226381.

The liquid crystal display apparatus disclosed in Japanese Unexamined Patent Application Publication No. 2012-226381 includes a plurality of pixels arranged in a two-dimensional matrix form, a shift register circuit, a one-line latch circuit, a plurality of comparators, and a plurality of analog switches. The shift register circuit sequentially captures a plurality of picture signals for the number of columns of the plurality of pixels. The one-line latch circuit simultaneously outputs the plurality of picture signals captured by the shift register. The plurality of comparators compare each of the plurality of picture signals output from the one-line latch circuit with the count value of a gradation counter to generate a matching pulse when they match. Each of the plurality of analog switches samples ramp voltage at the time of receiving the matching pulse from the corresponding comparator, and outputs the sampled ramp voltage to the pixel in the corresponding column.

Here, in this liquid crystal display apparatus, a feeding line on which a first ramp voltage propagates is connected to a plurality of analog switches corresponding to the pixels in even columns, and a feeding line on which a second ramp voltage propagates is connected to a plurality of analog switches corresponding to the pixels in odd columns. In this way, even when a large number of picture signals with the same gradation level are to be written to a large number of respective pixels and a large number of analog switches are simultaneously turned on, this liquid crystal display apparatus can suppress the fluctuation of load applied per feeding line of ramp voltage. In this way, the liquid crystal display apparatus can suppress the fluctuation (ringing) of each ramp voltage, and can therefore reduce the deterioration of image quality.

SUMMARY

Although even when a large number of picture signals with the same gradation level are to be written to a large number of respective pixels and a large number of analog switches are simultaneously turned on, the liquid crystal display apparatus disclosed in Japanese Unexamined Patent Application Publication No. 2012-226381 can suppress the fluctuation of load applied per feeding line of ramp voltage and can therefore suppress the fluctuation (ringing) of each ramp voltage, it cannot suppress the fluctuation of power supply voltage, and therefore has a problem of not being able to sufficiently reduce the deterioration of image quality.

A liquid crystal display apparatus according to one aspect of the present disclosure includes: an image display unit having a plurality of pixels arranged in a two-dimensional matrix form; a ramp signal generation circuit configured to shift a plurality of ramp signals, whose potentials linearly increase at a horizontal scanning cycle, by respective different shift amounts, and output the shifted plurality of ramp signals; a signal processing circuit configured to add a correction value corresponding to a shift amount of an assigned ramp signal to each of a plurality of picture signals for the number of columns of the plurality of pixels used in one horizontal scanning period; a horizontal shift register configured to sequentially capture the plurality of picture signals processed by the signal processing circuit; a latch circuit configured to simultaneously output the plurality of picture signals captured by the horizontal shift register; a gradation counter configured to perform count-up operation at the horizontal scanning cycle; a plurality of comparators configured to output a matching signal when each of the plurality of picture signals output from the latch circuit matches a count value of the gradation counter; and a switch circuit configured to output, to a pixel in a column corresponding to a comparator from which the matching signal is output among the plurality of comparators, one of voltages of the plurality of ramp signals corresponding to the pixel at timing when the matching signal is output.

A liquid crystal display apparatus according to one aspect of the present disclosure includes: an image display unit having a plurality of pixels arranged in a two-dimensional matrix form; a ramp signal generation circuit configured to shift first and second ramp signals, whose potentials linearly increase at a horizontal scanning cycle, by respective different shift amounts, and output the shifted first and second ramp signals; a signal processing circuit configured to add a correction value corresponding to a shift amount of the first ramp signal to a picture signal corresponding to the first ramp signal, and add a correction value corresponding to a shift amount of the second ramp signal to a picture signal corresponding to the second ramp signal, among a plurality of picture signals for the number of columns of the plurality of pixels used in one horizontal scanning period; a horizontal shift register configured to sequentially capture the plurality of picture signals processed by the signal processing circuit; a latch circuit configured to simultaneously output the plurality of picture signals captured by the horizontal shift register; a gradation counter configured to perform count-up operation at the horizontal scanning cycle; a plurality of comparators configured to output a matching signal when each of the plurality of picture signals output from the latch circuit matches a count value of the gradation counter; and a switch circuit configured to output, to a pixel in a column corresponding to a comparator from which the matching signal is output among the plurality of comparators, one of voltages of the first ramp signal and the second ramp signal corresponding to the pixel at timing when the matching signal is output.

A method for controlling a liquid crystal display apparatus according to one aspect of the present disclosure is a method for controlling a liquid crystal display apparatus, the liquid crystal display apparatus including: an image display unit having a plurality of pixels arranged in a two-dimensional matrix form; a ramp signal generation circuit configured to output a plurality of ramp signals whose potentials linearly increase at a horizontal scanning cycle; a signal processing circuit; a horizontal shift register configured to sequentially capture the plurality of picture signals processed by the signal processing circuit; a latch circuit configured to simultaneously output the plurality of picture signals captured by the horizontal shift register; a gradation counter configured to perform count-up operation at the horizontal scanning cycle; a plurality of comparators configured to output a matching signal when each of the plurality of picture signals output from the latch circuit matches a count value of the gradation counter; and a switch circuit configured to output, to a pixel in a column corresponding to a comparator from which the matching signal is output among the plurality of comparators, one of voltages of the plurality of ramp signals corresponding to the pixel at timing when the matching signal is output, in which in the ramp signal generation circuit, the plurality of ramp signals are shifted by respective different shift amounts, and in the signal processing circuit, a correction value corresponding to a shift amount of an assigned ramp signal is added to each of the plurality of picture signals for the number of columns of the plurality of pixels used in one horizontal scanning period.

The above and other aspects, advantages and features will be more apparent from the following description of certain embodiments taken in conjunction with the accompanying drawings, in which:

DETAILED DESCRIPTION

<Prior Study by the Present Inventors>

Figure 10:
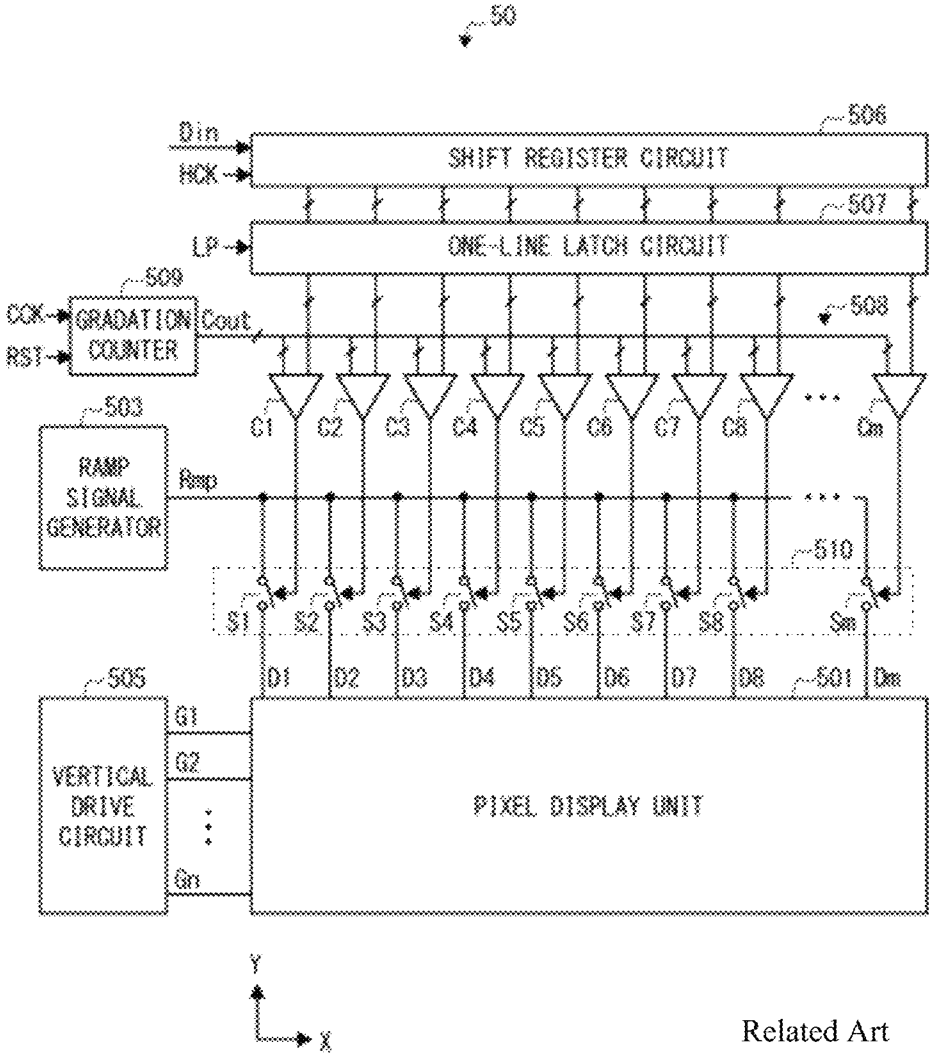
FIG. 10 is a diagram illustrating a first configuration example of a liquid crystal display apparatus that has been studied in advance.
Figure 11:
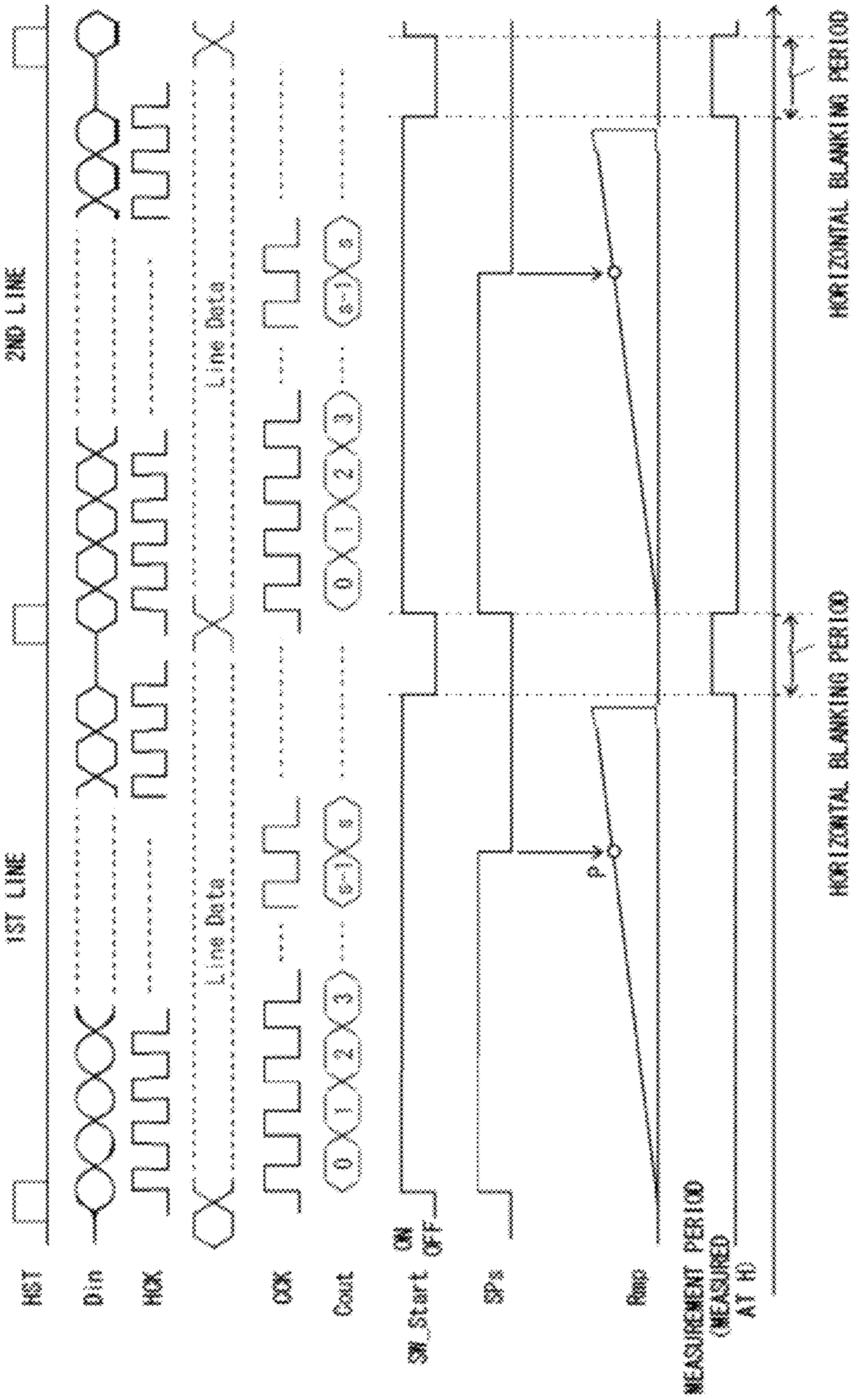
FIG. 11 is a timing chart illustrating operation of the liquid crystal display apparatus shown in FIG. 10.

First, a liquid crystal display apparatus that has been studied in advance by the present inventors will be described with reference to FIGS. 10 and 11. FIG. 10 is a diagram illustrating a configuration example of a liquid crystal display apparatus 50 that has been studied in advance. Further, FIG. 11 is a timing chart illustrating operation of the liquid crystal display apparatus 50.

The liquid crystal display apparatus 50 is an active matrix type liquid crystal display apparatus, and includes a pixel display unit 501, a ramp signal generator 503, a vertical drive circuit 505, a shift register circuit 506, a one-line latch circuit 507, a comparator group 508, a gradation counter 509, and a switch circuit 510.

In the pixel-arranged area of the pixel display unit 501, n row scanning lines G1-Gn (where n is an integer of 2 or more) extending in the horizontal direction (the X-axis direction) and m data lines D1-Dm (where m is an integer of 2 or more) extending in the vertical direction (the Y-axis direction) are wired. Further, the pixel display unit 101 has a plurality of pixels (not shown) for n rows×m columns arranged in a regular manner. These plurality of pixels are arranged in a two-dimensional matrix form at a total of n×m intersections at which the n row scanning lines G1-Gn extending in the horizontal direction (the X-axis direction) and the m data lines D1-Dm extending in the vertical direction (the Y-axis direction) intersect with each other.

Each pixel has a liquid crystal display element. The liquid crystal display element is composed of, for example, a pixel drive electrode (a reflecting electrode) PE having light reflection characteristics, a common electrode CE that is disposed opposite to and apart from the pixel drive electrode PE and has optical transparency, and a liquid crystal LCM filled and sealed in the space between them. A common voltage Vcom is applied to the common electrode CE. At each pixel, a voltage corresponding to the picture signal is applied to the pixel drive electrode PE, so that an image is displayed at a gradation level corresponding to the picture signal.

A row scanning line Gj (where j is any integer of 1-n), which is a row scanning line at any row among the n row scanning lines G1-Gn, is commonly connected to each of the m pixels arranged in the j-th row. Further, a data line Di (where i is any integer of 1-m), which is a data line at any column among the m data lines D1-Dm, is commonly connected to each of the n pixels arranged in the i-th column.

The shift register circuit 506 starts shifting operation when being supplied with a pulse signal of a horizontal synchronization signal HST (not shown). Specifically, the shift register circuit 506 sequentially captures picture signals Din having a width of q bits (where q is an integer of 2 or more) for m columns used in one horizontal scanning period, synchronously with a clock signal HCK.

The one-line latch circuit 507 simultaneously outputs the picture signals for m columns captured by the shift register circuit 506 at timing when a trigger signal LP is temporarily activated.

The gradation counter 509 performs count-up operation synchronously with the rise of a clock signal CCK, and outputs a gradation signal Cout with a gradation level represented by the count value. For example, the gradation counter 509 outputs a gradation signal Cout at a count value of "0", which is the lowest gradation, at the beginning of one horizontal scanning period (at the rise of the horizontal synchronization signal HST), increases the gradation level of the gradation signal Cout as the count value increases, and then outputs a gradation signal Cout at a count value of "(2^q)−1", which is the maximum gradation, at the end of the one horizontal scanning period (just before the next rise of the horizontal synchronization signal HST). Note that the count value of the gradation counter 509 is initialized to "0" in response to, for example, the reset signal RST being activated with the rise of the horizontal synchronization signal HST.

The comparator group 508 is composed of m comparators C1-Cm corresponding to the pixels of the m columns. The m comparators C1-Cm each output a matching signal when each of the m picture signals output from the one-line latch circuit 507 matches the count value (the gradation signal Cout) of the gradation counter 509.

The ramp signal generator 503 generates a ramp signal Rmp whose potential linearly increases from a reference potential at a horizontal scanning cycle. The ramp signal Rmp is a sweep signal whose picture level changes from a black level to a white level from the beginning to the end of each horizontal scanning period. Note that for the horizontal scanning cycle, one horizontal scanning period is one cycle, and the horizontal scanning cycle is a cycle of accessing the m pixels for one row. Further, the horizontal scanning cycle is also the pulse cycle of the horizontal synchronization signal HST.

The switch circuit 510 includes m switch elements S1-Sm corresponding to the pixels of the m columns. The switch circuit 510 outputs, to the pixel in a column corresponding to a comparator from which the matching signal is output among the m comparators C1-Cm, the voltage of the ramp signal Rmp at the timing when the matching signal is output as a writing voltage to the pixel.

Specifically, the switch elements S1-Sm are simultaneously turned on in response to the start signal SW_Start becoming active (e.g., the H level) at the beginning of the horizontal scanning period. Thereafter, the switch elements S1-Sm are switched from on to off in response to the matching signal output from the comparators C1-Cm, respectively, becoming active (e.g., the L level). Note that the start signal SW_Start becomes inactive (e.g., the L level) at the end of the horizontal scanning period.

In the example of FIG. 11, a waveform representing the timing of switching on/off of a switch element Sr (where r is any integer of 1-m) provided corresponding to a pixel to which the picture signal with the gradation level s is written is shown as a waveform SPs. Referring to FIG. 11, the switch element Sr is turned on at the rise of the start signal SW_Start, and then switched from on to off in response to the matching signal becoming active. Here, the switch element Sr samples the potential of the ramp signal Rmp at the timing of being switched from on to off (the potential at the point P in FIG. 11). This sampled potential at the point P is supplied to the data line Dr. In other words, the potential at the point P, which is the result of the DA conversion of the picture signal with the gradation level s, is supplied to the data line Dr.

As described above, while the switch elements S1-Sm are turned on simultaneously at the beginning of each horizontal scanning period, each of them is turned off at any timing corresponding to the gradation level of the image to be displayed at the corresponding pixel. That is, the switch elements S1-Sm may all be turned off simultaneously or turned off at different timings. Further, the order in which they are turned off is not fixed.

The vertical drive circuit 505 sequentially outputs a scanning pulse for the n rows, row by row, from the first row scanning line G1 to the n-th row scanning line Gn for each lapse of one horizontal scanning period. Then, it becomes possible to write voltages corresponding to the picture signals to the pixels for m columns connected to a row scanning line supplied with the scanning pulse among the n row scanning lines G1-Gn. In other words, when the scanning pulse is supplied to the j-th row scanning line Gj, it becomes possible to write voltages corresponding to the picture signals to the pixels for m columns on the j-th row.

However, in the liquid crystal display apparatus 50, when a large number of picture signals with the same gradation level are written to a large number of respective pixels (e.g., when black is displayed on a large part of the screen), a large number of switch elements provided in the switch circuit 510 are simultaneously turned on to sample the ramp signal, so the load on the signal line on which the ramp signal propagates fluctuates significantly. As a result, the voltage fluctuation (ringing) of the ramp signal increases, which increases the deterioration of image quality, such as gradation errors or pseudo contour generation.

Therefore, the present inventors have then studied a liquid crystal display apparatus 60.

Figure 12:
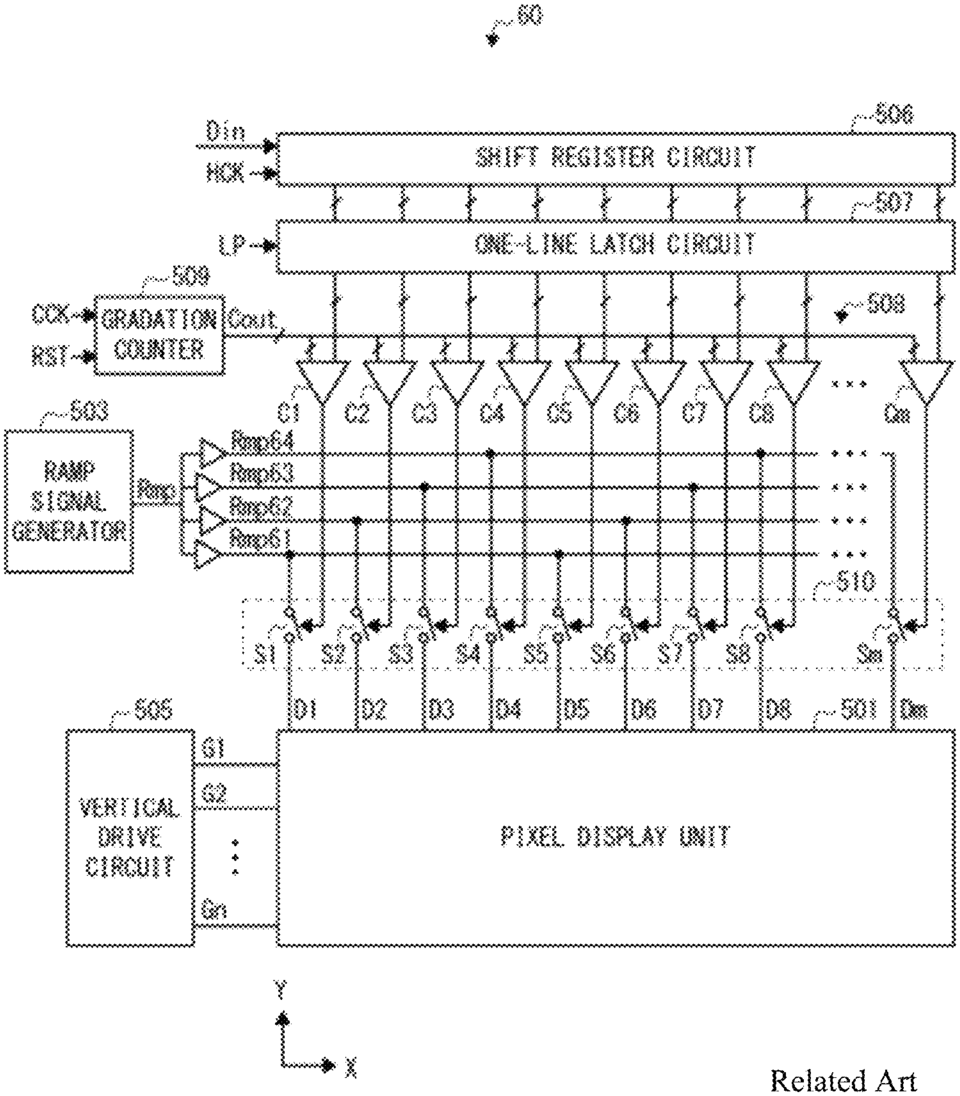
Related Art Fig. 12
FIG. 12 is a diagram illustrating a second configuration example of a liquid crystal display apparatus that has been studied in advance.

FIG. 12 is a diagram illustrating a configuration example of the liquid crystal display apparatus 60 that has been studied in advance. In the liquid crystal display apparatus 60, the signal line on which the ramp signal Rmp propagates is branched into four lines via four buffers, as compared to the liquid crystal display apparatus 50. Hereinafter, the four branched signal lines will be referred to as signal lines Rmp61-Rmp64.

The m data lines D1-Dm are divided into four data line groups DG1-DG4 corresponding to the four signal lines Rmp61-Rmp64. For example, the first data line group DG1 is composed of the data lines of the (a multiple of 4+1)-th columns, such as 1st, 5th, and 9th columns, among the m data lines D1-Dm. The second data line group DG2 is composed of the data lines of the (a multiple of 4+2)-th columns, such as 2nd, 6th, and 10th columns, among the m data lines D1-Dm. The third data line group DG3 is composed of the data lines of the (a multiple of 4+3)-th columns, such as 3rd, 7th, and 11th columns, among the m data lines D1-Dm. The fourth data line group DG4 is composed of the data lines of the (a multiple of 4)-th columns, such as 4th, 8th, and 12th columns, among the m data lines D1-Dm.

Here, the signal line Rmp61 is connected to the first data line group DG1 via the switch circuit 510. The signal line Rmp62 is connected to the second data line group DG2 via the switch circuit 510. The signal line Rmp63 is connected to the third data line group DG3 via the switch circuit 510. The signal line Rmp64 is connected to the fourth data line group DG4 via the switch circuit 510.

In a case where a large number of picture signals with the same gradation level are written to a large number of respective pixels, even when a large number of switch elements provided in the switch circuit 510 are simultaneously turned on, the liquid crystal display apparatus 60 can suppress the fluctuation of load applied per ramp signal line. In this way, the liquid crystal display apparatus 60 can suppress the voltage fluctuation (ringing) of each ramp signal, and can therefore reduce the deterioration of image quality, such as gradation errors or pseudo contour generation.

However, although the liquid crystal display apparatus 60 can suppress the fluctuation (ringing) of each ramp voltage by suppressing the fluctuation of load applied per feeding line of ramp voltage, it cannot suppress the fluctuation of power supply voltage, and therefore has a problem of not being able to reduce the deterioration of image quality, such as in-plane luminance unevenness or fixed noise in the shape of vertical streaks. That is, the liquid crystal display apparatus 60 has a problem of not being able to sufficiently reduce the deterioration of image quality.

Therefore, a liquid crystal display apparatus 1 capable of reducing the deterioration of image quality described above has been found.

Embodiment 1

Figure 1:
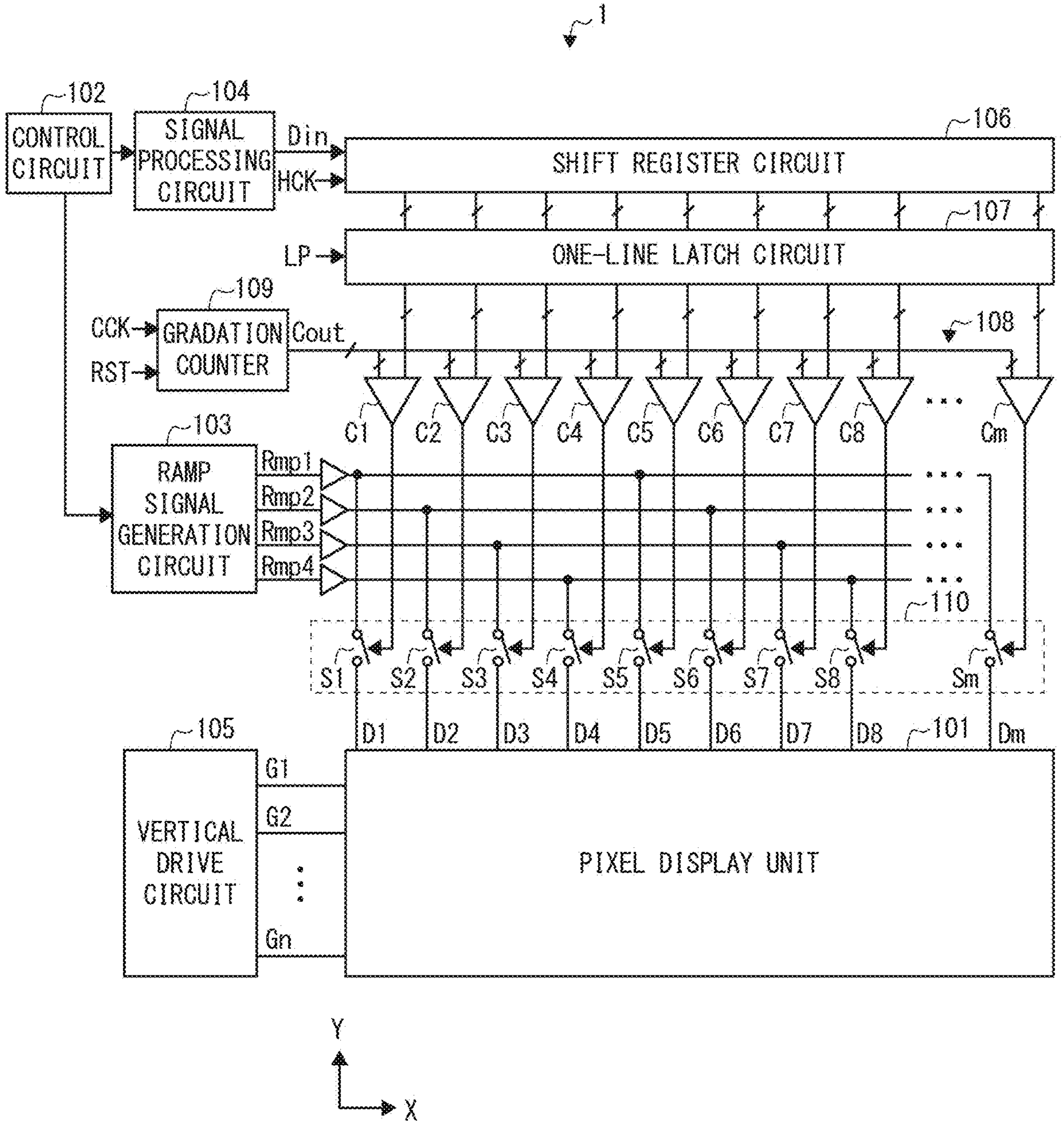
FIG. 1 is a diagram illustrating a configuration example of a liquid crystal display apparatus according to a first embodiment.

FIG. 1 is a diagram illustrating a configuration example of the liquid crystal display apparatus 1 according to a first embodiment. The liquid crystal display apparatus 1 is an active matrix type liquid crystal display apparatus, and includes a pixel display unit (an image display unit) 101, a control circuit 102, a ramp signal generation circuit 103, a signal processing circuit 104, a vertical drive circuit 105, a shift register circuit (a horizontal shift register) 106, a one-line latch circuit (a latch circuit) 107, a comparator group 108, a gradation counter 109, and a switch circuit 110. The shift register circuit 106, the one-line latch circuit 107, the comparator group 108, the gradation counter 109, and the switch circuit 110 constitute a data line drive circuit. Note that the basic operation flow of the liquid crystal display apparatus 1 is the same as those of the liquid crystal display apparatuses 50 and 60.

In the pixel-arranged area of the pixel display unit 101, n row scanning lines G1-Gn (where n is an integer of 2 or more) extending in the horizontal direction (the X-axis direction) and m data lines D1-Dm (where m is an integer of 2 or more) extending in the vertical direction (the Y-axis direction) are wired. Further, the pixel display unit 101 has a plurality of pixels (not shown) for n rows×m columns arranged in a regular manner. These plurality of pixels are arranged in a two-dimensional matrix form at a total of n×m intersections at which the n row scanning lines G1-Gn extending in the horizontal direction (the X-axis direction) and the m data lines D1-Dm extending in the vertical direction (the Y-axis direction) intersect with each other.

Each pixel has a liquid crystal display element. The liquid crystal display element is composed of, for example, a pixel drive electrode (a reflecting electrode) PE having light reflection characteristics, a common electrode CE that is disposed opposite to and apart from the pixel drive electrode PE and has optical transparency, and a liquid crystal LCM filled and sealed in the space between them. A common voltage Vcom is applied to the common electrode CE. At each pixel, a voltage corresponding to the picture signal is applied to the pixel drive electrode PE, so that an image is displayed at a gradation level corresponding to the picture signal.

A row scanning line Gj (where j is any integer of 1-n), which is a row scanning line at any row among the n row scanning lines G1-Gn, is commonly connected to each of the m pixels arranged in the j-th row. Further, a data line Di (where i is any integer of 1-m), which is a data line at any column among the m data lines D1-Dm, is commonly connected to each of the n pixels arranged in the i-th column.

The shift register circuit 106 starts shifting operation when being supplied with a pulse signal of a horizontal synchronization signal HST (not shown). Specifically, the shift register circuit 106 sequentially captures picture signals Din having a width of q bits (where q is an integer of 2 or more) for m columns used in one horizontal scanning period, synchronously with a clock signal HCK.

The one-line latch circuit 107 simultaneously outputs the picture signals for m columns captured by the shift register circuit 106 at timing when a trigger signal LP is temporarily activated.

The gradation counter 109 performs count-up operation synchronously with the rise of a clock signal CCK, and outputs a gradation signal Cout with a gradation level represented by the count value. For example, the gradation counter 109 outputs a gradation signal Cout at a count value of "0", which is the lowest gradation, at the beginning of one horizontal scanning period (at the rise of the horizontal synchronization signal HST), increases the gradation level of the gradation signal Cout as the count value increases, and then outputs a gradation signal Cout at a count value of "(2^q)−1", which is the maximum gradation, at the end of the one horizontal scanning period (just before the next rise of the horizontal synchronization signal HST). Note that the count value of the gradation counter 109 is initialized to "0" in response to, for example, the reset signal RST being activated with the rise of the horizontal synchronization signal HST.

The comparator group 108 is composed of m comparators C1-Cm corresponding to the pixels of the m columns. The m comparators C1-Cm each output a matching signal when each of the m picture signals output from the one-line latch circuit 107 matches the count value (the gradation signal Cout) of the gradation counter 109.

The ramp signal generation circuit 103 generates a ramp signal whose potential linearly increases from a reference potential at a horizontal scanning cycle. The ramp signal is a sweep signal whose picture level changes from a black level to a white level from the beginning to the end of each horizontal scanning period. Details of the ramp signal generation circuit 103 will be described later together with the signal processing circuit 104.

The switch circuit 110 includes m switch elements S1-Sm corresponding to the pixels of the m columns. The switch circuit 110 outputs, to the pixel in a column corresponding to a comparator from which the matching signal is output among the m comparators C1-Cm, the voltage of the ramp signal at the timing when the matching signal is output as a writing voltage to the pixel.

More specifically, the switch elements S1-Sm are simultaneously turned on in response to the start signal SW_Start becoming active (e.g., the H level) at the beginning of the horizontal scanning period. Thereafter, the switch elements S1-Sm are switched from on to off in response to the matching signal output from the comparators C1-Cm, respectively, becoming active (e.g., the L level). Note that the start signal SW_Start becomes inactive (e.g., the L level) at the end of the horizontal scanning period.

As described above, while the switch elements S1-Sm are turned on simultaneously at the beginning of each horizontal scanning period, each of them is turned off at any timing corresponding to the gradation level of the image to be displayed at the corresponding pixel. That is, the switch elements S1-Sm may all be turned off simultaneously or turned off at different timings. Further, the order in which they are turned off is not fixed.

The vertical drive circuit 105 sequentially outputs a scanning pulse for the n rows, row by row, from the first row scanning line G1 to the n-th row scanning line Gn for each lapse of one horizontal scanning period. Then, it becomes possible to write voltages corresponding to the picture signals to the pixels for m columns connected to a row scanning line supplied with the scanning pulse among the n row scanning lines G1-Gn. In other words, when the scanning pulse is supplied to the j-th row scanning line Gj, it becomes possible to write voltages corresponding to the picture signals to the pixels for m columns on the j-th row.

More specifically, the ramp signal generation circuit 103 generates a ramp signal (a first ramp signal) Rmp1, a ramp signal (a second ramp signal) Rmp2, a ramp signal Rmp3, and a ramp signal Rmp4 whose respective timings of starting to linearly increase the potential are shifted by different shift amounts. Hereinafter, the four signal lines on which the ramp signals Rmp1-Rmp4 propagate will be referred to as signal lines Rmp1-Rmp4, respectively.

The m data lines D1-Dm are divided into four data line groups DG1-DG4 corresponding to the four signal lines Rmp1-Rmp4. For example, the first data line group DG1 is composed of the data lines of the (a multiple of 4+1)-th columns, such as 1st, 5th, and 9th columns, among the m data lines D1-Dm. The second data line group DG2 is composed of the data lines of the (a multiple of 4+2)-th columns, such as 2nd, 6th, and 10th columns, among the m data lines D1-Dm. The third data line group DG3 is composed of the data lines of the (a multiple of 4+3)-th columns, such as 3rd, 7th, and 11th columns, among the m data lines D1-Dm. The fourth data line group DG4 is composed of the data lines of the (a multiple of 4)-th columns, such as 4th, 8th, and 12th columns, among the m data lines D1-Dm. However, the combination of a plurality of data lines constituting each of the data line groups DG1-DG4 may be determined in any manner.

Here, the signal line Rmp1 is connected to the first data line group DG1 via the switch circuit 110. The signal line Rmp2 is connected to the second data line group DG2 via the switch circuit 110. The signal line Rmp3 is connected to the third data line group DG3 via the switch circuit 110. The signal line Rmp4 is connected to the fourth data line group DG4 via the switch circuit 110.

The signal processing circuit 104 adds a correction value corresponding to the shift amount of the ramp signal Rmp1 to the picture signals corresponding to the ramp signal Rmp1 among the picture signals for m columns used in one horizontal scanning period. Note that the shift amount of the ramp signal Rmp1 is 0 in this example. The signal processing circuit 104 adds a correction value corresponding to the shift amount of the ramp signal Rmp2 to the picture signals corresponding to the ramp signal Rmp2 among the picture signals for m columns used in one horizontal scanning period. The signal processing circuit 104 adds a correction value corresponding to the shift amount of the ramp signal Rmp3 to the picture signals corresponding to the ramp signal Rmp3 among the picture signals for m columns used in one horizontal scanning period. The signal processing circuit 104 adds a correction value corresponding to the shift amount of the ramp signal Rmp4 to the picture signals corresponding to the ramp signal Rmp4 among the picture signals for m columns used in one horizontal scanning period.

Here, the picture signals corresponding to the ramp signal Rmp1 are picture signals used for sampling the ramp signal Rmp1, and are picture signals written to the pixels connected to the first data line group DG1. The picture signals corresponding to the ramp signal Rmp2 are picture signals used for sampling the ramp signal Rmp2, and are picture signals written to the pixels connected to the second data line group DG2. The picture signals corresponding to the ramp signal Rmp3 are picture signals used for sampling the ramp signal Rmp3, and are picture signals written to the pixels connected to the third data line group DG3. The picture signals corresponding to the ramp signal Rmp4 are picture signals used for sampling the ramp signal Rmp4, and are picture signals written to the pixels connected to the fourth data line group DG4.

The control circuit 102 controls each of the ramp signal generation circuit 103 and the signal processing circuit 104. For example, the control circuit 102 adjusts the respective shift amounts of the ramp signals Rmp1-Rmp4 generated by the ramp signal generation circuit 103 and the correction value (additional value) added to each picture signal in the signal processing circuit 104. In this way, the control circuit 102 can cancel the effect of the shift applied to each of the ramp signals Rmp1-Rmp4 by the correction value added to each picture signal.

Specifically, the control circuit 102 adjusts the respective shift amounts of the ramp signals Rmp1-Rmp4 and the correction values (additional values) added to the respective picture signals in the signal processing circuit 104 so that the potentials of the ramp signals Rmp1-Rmp4 before being shifted that are sampled based on the respective picture signals before the correction values are added are the same as the potentials of the shifted ramp signals Rmp1-Rmp4 that are sampled based on the respective picture signals to which the correction values are added.

(Specific Example of Ramp Signal Generation Circuit 103)

Figure 2:
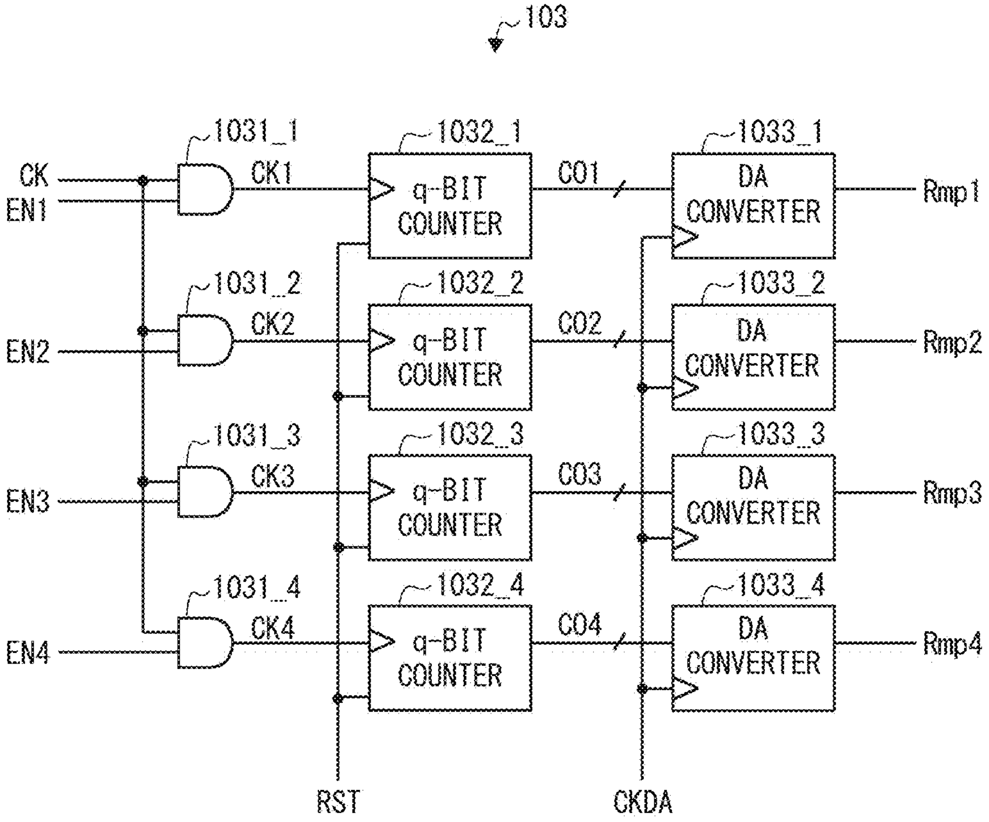
FIG. 2 is a diagram illustrating a specific configuration example of a ramp signal generation circuit provided in the liquid crystal display apparatus shown in FIG. 1.

FIG. 2 is a diagram illustrating a specific configuration example of the ramp signal generation circuit 103. As shown in FIG. 2, the ramp signal generation circuit 103 includes logical conjunction circuits (hereinafter referred to as AND circuits) 1031_1-1031_4, q-bit counters 1032_1-1032_4, and DA converters 1033_1-1033_4.

The AND circuit 1031_1 outputs the logical conjunction of a clock signal CK and an enable signal EN1 as a clock signal CK1. That is, the AND circuit 1031_1 outputs the clock signal CK as the clock signal CK1 while the enable signal EN1 is active (the H level). The AND circuit 1031_2 outputs the logical conjunction of the clock signal CK and an enable signal EN2 as a clock signal CK2. That is, the AND circuit 1031_2 outputs the clock signal CK as the clock signal CK2 while the enable signal EN2 is active (the H level). The AND circuit 10313 outputs the logical conjunction of the clock signal CK and an enable signal EN3 as a clock signal CK3. That is, the AND circuit 1031_3 outputs the clock signal CK as the clock signal CK3 while the enable signal EN3 is active (the H level). The AND circuit 1031_4 outputs the logical conjunction of the clock signal CK and an enable signal EN4 as a clock signal CK4. That is, the AND circuit 10314 outputs the clock signal CK as the clock signal CK4 while the enable signal EN4 is active (the H level).

The q-bit counter 1032_1 performs count-up operation of the q-bit count value CO1 in synchronization with the rise of the clock signal CK1. The q-bit counter 10322 performs count-up operation of the q-bit count value CO2 in synchronization with the rise of the clock signal CK2. The q-bit counter 1032_3 performs count-up operation of the q-bit count value CO3 in synchronization with the rise of the clock signal CK3. The q-bit counter 10324 performs count-up operation of the q-bit count value CO4 in synchronization with the rise of the clock signal CK4. Note that the count values CO1-CO4 of the q-bit counters 1032_1-1032_4 are initialized to "0" in response to the reset signal RST every time one horizontal scanning period has elapsed.

In synchronization with the rise of the clock signal CKDA, the DA converter 1033_1 converts the digital count value CO1 into an analog ramp signal Rmp1 and outputs the analog ramp signal Rmp1. In synchronization with the rise of the clock signal CKDA, the DA converter 1033_2 converts the digital count value CO2 into an analog ramp signal Rmp2 and outputs the analog ramp signal Rmp2. In synchronization with the rise of the clock signal CKDA, the DA converter 1033_3 converts the digital count value CO3 into an analog ramp signal Rmp3 and outputs the analog ramp signal Rmp3. In synchronization with the rise of the clock signal CKDA, the DA converter 1033_4 converts the digital count value CO4 into an analog ramp signal Rmp4 and outputs the analog ramp signal Rmp4.

Figure 3:
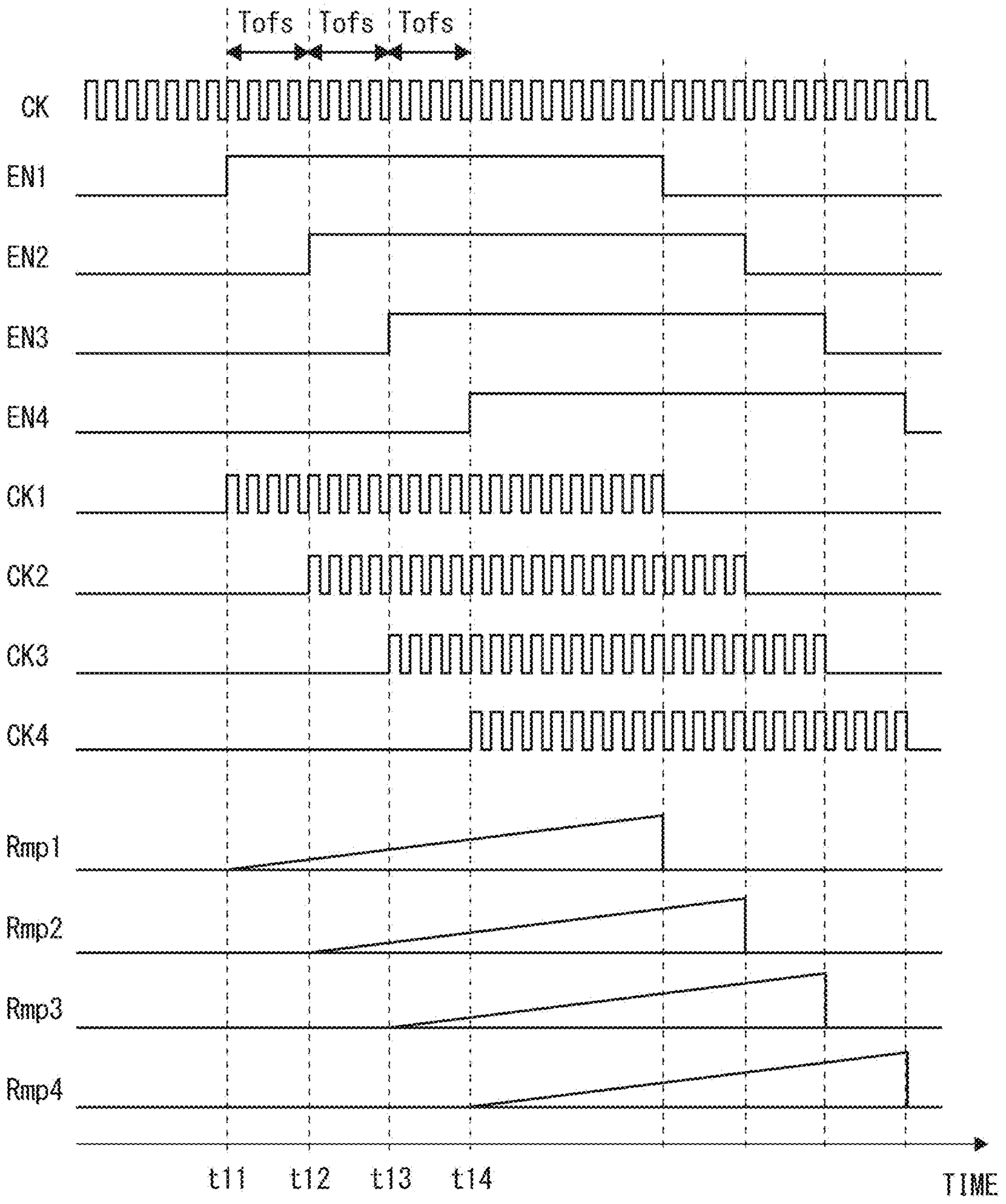
FIG. 3 is a timing chart illustrating operation of the ramp signal generation circuit shown in FIG. 2.

FIG. 3 is a timing chart illustrating operation of the ramp signal generation circuit 103. As shown in FIG. 3, the respective active periods of the enable signals EN1-EN4 are equal, and the respective times of activating the enable signals EN1-EN4 are different.

First, when the enable signal EN1 becomes active, the AND circuit 1031_1 begins to output the clock signal CK as the clock signal CK1 (at the time t11). In this way, the q-bit counter 1032_1 starts count-up operation of the count value CO1 (at the time t11). In this way, the DA converter 1033_1 starts to linearly increase the potential of the ramp signal Rmp1 (at the time t11). The potential of the ramp signal Rmp1 stops the linear increase in response to the enable signal EN1 becoming inactive, and is initialized to the reference potential (0 V).

Further, when the enable signal EN2 is activated after a predetermined period of Tofs has elapsed since the activation of the enable signal EN1, the AND circuit 1031_2 begins to output the clock signal CK as the clock signal CK2 (at the time t12). In this way, the q-bit counter 1032_2 starts count-up operation of the count value CO2 (at the time t12). In this way, the DA converter 1033_2 starts to linearly increase the potential of the ramp signal Rmp2 (at the time t12). The potential of the ramp signal Rmp2 stops the linear increase in response to the enable signal EN2 becoming inactive, and is initialized to the reference potential (0 V).

Further, when the enable signal EN3 is activated after the predetermined period of Tofs has elapsed since the activation of the enable signal EN2, the AND circuit 1031_3 begins to output the clock signal CK as the clock signal CK3 (at the time t13). In this way, the q-bit counter 1032_3 starts count-up operation of the count value CO3 (at the time t13). In this way, the DA converter 1033_3 starts to linearly increase the potential of the ramp signal Rmp3 (at the time t13). The potential of the ramp signal Rmp3 stops the linear increase in response to the enable signal EN3 becoming inactive, and is initialized to the reference potential (0 V).

Further, when the enable signal EN4 is activated after the predetermined period of Tofs has elapsed since the activation of the enable signal EN3, the AND circuit 1031_4 begins to output the clock signal CK as the clock signal CK4 (at the time t14). In this way, the q-bit counter 1032_4 starts count-up operation of the count value CO4 (at the time t14). In this way, the DA converter 1033_4 starts to linearly increase the potential of the ramp signal Rmp4 (at the time t14). The potential of the ramp signal Rmp4 stops the linear increase in response to the enable signal EN4 becoming inactive, and is initialized to the reference potential (0 V).

In this way, the ramp signal generation circuit 103 generates the ramp signal Rmp1 and the ramp signals Rmp2, Rmp3, and Rmp4 obtained by shifting the ramp signal Rmp1 later by predetermined periods of Tofs, Tofs×2, and Tofs×3, respectively. Note that the ramp signal generation circuit 103 can be appropriately modified to another configuration that can realize the same operation as the configuration shown in FIG. 2.

(Specific Example of Signal Processing Circuit 104)

Figure 4:
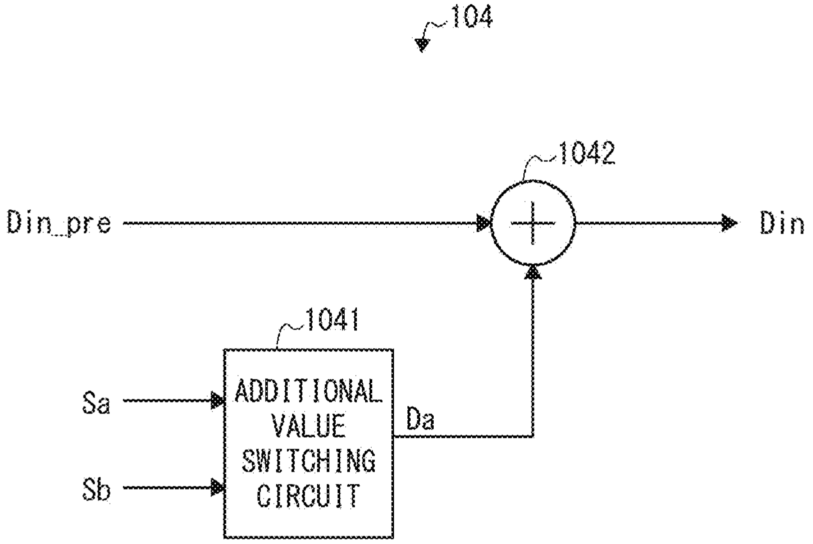
FIG. 4 is a diagram illustrating a specific configuration example of a signal processing circuit provided in the liquid crystal display apparatus shown in FIG. 1.

FIG. 4 is a diagram illustrating a specific configuration example of the signal processing circuit 104. As shown in FIG. 4, the signal processing circuit 104 includes an additional value switching circuit 1041 and an addition circuit 1042. The additional value switching circuit 1041 outputs an additional value (a correction value) Da corresponding to control signals Sa and Sb. The addition circuit 1042 adds the picture signal Din_pre before processing and the additional value Da, and outputs the result as a processed picture signal Din. The picture signal Din processed by the signal processing circuit 104 is captured by the shift register circuit 106.

Figure 5:
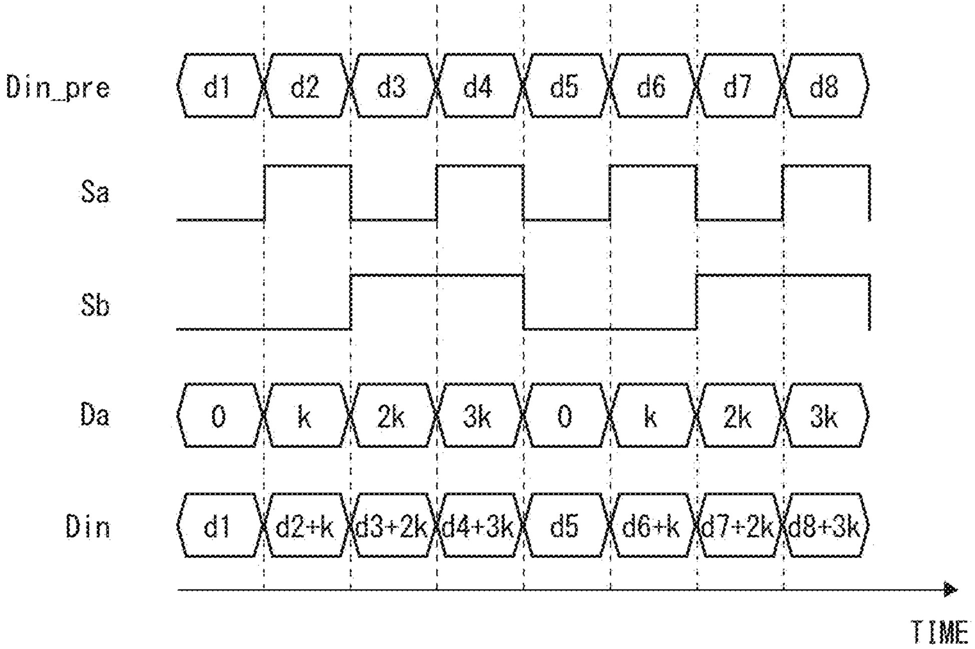
FIG. 5 is a timing chart illustrating operation of the signal processing circuit shown in FIG. 4.

FIG. 5 is a timing chart illustrating operation of the signal processing circuit 104. In the example of FIG. 5, picture signals of "d1", "d2", "d3", "d4", "d5", "d6", "d7", and "d8" are sequentially input to the signal processing circuit 104 as the picture signal Din_pre.

Note that the picture signal of "d1" is a picture signal written to the pixel in the first column. The picture signal of "d2" is a picture signal written to the pixel in the second column. The picture signal of "d3" is a picture signal written to the pixel in the third column. The picture signal of "d4" is a picture signal written to the pixel in the fourth column. The picture signal of "d5" is a picture signal written to the pixel in the fifth column. The picture signal of "d6" is a picture signal written to the pixel in the sixth column. The picture signal of "d7" is a picture signal written to the pixel in the seventh column. The picture signal of "d8" is a picture signal written to the pixel in the eighth column.

The additional value switching circuit 1041 periodically outputs four types of additional values (correction values) corresponding to the control signals Sa and Sb. For example, the additional value switching circuit 1041 outputs an additional value of "0" in response to the control signal Sa indicating the L level and the control signal Sb indicating the L level. Thereafter, the additional value switching circuit 1041 outputs an additional value of "k" in response to the control signal Sa indicating the H level and the control signal Sb indicating the L level. Thereafter, the additional value switching circuit 1041 outputs an additional value of "2k" in response to the control signal Sa indicating the L level and the control signal Sb indicating the H level. Thereafter, the additional value switching circuit 1041 outputs an additional value of "3k" in response to the control signal Sa indicating the H level and the control signal Sb indicating the H level. The additional value switching circuit 1041 repeats such operation. Note that although the additional value of "k" is set so that the time taken for the gradation counter 109 to count the additional value of "k" is the same as the predetermined period of Tofs, which is the shift amount of the ramp signal Rmp2, the present disclosure is not limited thereto.

The addition circuit 1042 adds an additional value of "0" to the picture signal of "d1" to output a picture signal of "d1", then adds an additional value of "k" to the picture signal of "d2" to output a picture signal of "d2+k", then adds an additional value of "2k" to the picture signal of "d3" to output a picture signal of "d3+2k", and then adds an additional value of "3k" to the picture signal of "d4" to output a picture signal of "d4+3k". Similarly, the addition circuit 1042 adds an additional value of "0" to the picture signal of "d5" to output a picture signal of "d5", then adds an additional value of "k" to the picture signal of "d6" to output a picture signal of "d6+k", then adds an additional value of "2k" to the picture signal of "d7" to output a picture signal of "d7+2k", and then adds an additional value of "3k" to the picture signal of "d8" to output a picture signal of "d8+3k". In the signal processing circuit 104, the same processing is performed for picture signals after "d9".

Then, the signal processing circuit 104 sequentially outputs the picture signals of "d1", "d2+k", "d3+2k", "d4+3k", "d5", "d6+k", "d7+2k", and "d8+3k" as the processed picture signal Din. The processed picture signal Din is captured by the shift register circuit 106.

Figure 6:
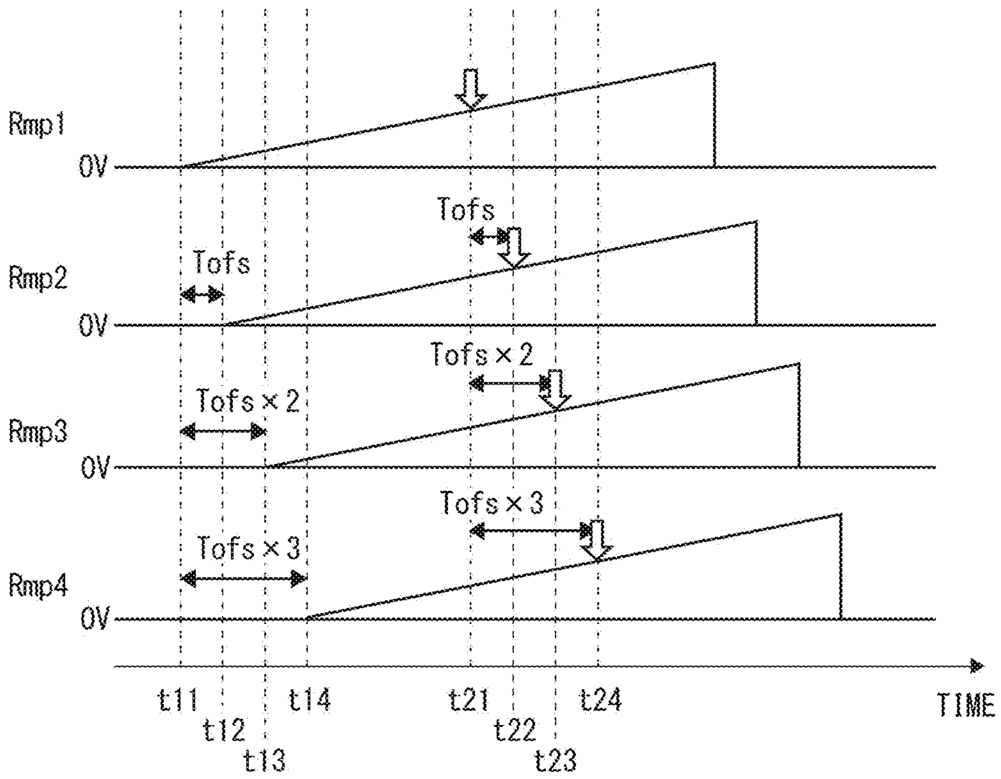
FIG. 6 is a timing chart illustrating a part of operation of the liquid crystal display apparatus shown in FIG. 1.

FIG. 6 is a timing chart illustrating a part of operation of the liquid crystal display apparatus 1. Note that although the example of FIG. 6 assumes that the gradation levels of the picture signals of "d1", "d2", "d3", and "d4" before being processed by the signal processing circuit 104 are the same, the present disclosure is not limited thereto.

As shown in FIG. 6, the timing of starting to linearly increase the ramp signal Rmp2 is shifted later than the timing of starting to linearly increase the ramp signal Rmp1 by the predetermined period of Tofs. The timing of starting to linearly increase the ramp signal Rmp3 is shifted later than the timing of starting to linearly increase the ramp signal Rmp1 by the predetermined period of Tofs2 (=Tofs×2). The timing of starting to linearly increase the ramp signal Rmp4 is shifted later than the timing of starting to linearly increase the ramp signal Rmp1 by the predetermined period of Tofs3 (=Tofs×3).

Here, the time taken for the gradation counter 109 to count the additional value of "k" included in the processed picture signal of "d2+k" is equal to the predetermined period of Tofs. Therefore, the timing of sampling the ramp signal Rmp2 based on the picture signal of "d2+k" is shifted later than the timing of sampling the ramp signal Rmp1 based on the picture signal of "d1" by the predetermined period of Tofs.

Further, the time taken for the gradation counter 109 to count the additional value of "2k" included in the processed picture signal of "d3+2k" is equal to the predetermined period of Tofs2. Therefore, the timing of sampling the ramp signal Rmp3 based on the picture signal of "d3+2k" is shifted later than the timing of sampling the ramp signal Rmp1 based on the picture signal of "d1" by the predetermined period of Tofs2.

Further, the time taken for the gradation counter 109 to count the additional value of "3k" included in the processed picture signal of "d4+3k" is equal to the predetermined period of Tofs3. Therefore, the timing of sampling the ramp signal Rmp4 based on the picture signal of "d4+3k" is shifted later than the timing of sampling the ramp signal Rmp1 based on the picture signal of "d1" by the predetermined period of Tofs3.

In this way, the voltage obtained by sampling the ramp signal Rmp1 based on the picture signal of "d1", the voltage obtained by sampling the ramp signal Rmp2 based on the picture signal of "d2+k", the voltage obtained by sampling the ramp signal Rmp3 based on the picture signal of "d3+2k", and the voltage obtained by sampling the ramp signal Rmp4 based on the picture signal of "d4+3k" show the same value.

Thus, since the liquid crystal display apparatus 1 can shift the timings of sampling the ramp signals Rmp1-Rmp4 based on the picture signals of "d1", "d2", "d3", and "d4" with the same gradation level, it is possible to suppress the fluctuation of power supply voltage that occur when the timings of sampling ramp signals based on a plurality of picture signals with the same gradation level are simultaneous.

As described above, since the liquid crystal display apparatus 1 according to this embodiment can shift the timings of sampling ramp signals based on a plurality of picture signals with the same gradation level, it is possible to suppress the fluctuation of power supply voltage that occur when the timings of sampling ramp signals based on a plurality of picture signals with the same gradation level are simultaneous. As a result, the liquid crystal display apparatus 1 according to this embodiment can reduce the deterioration of image quality.

In this embodiment, although a case where the ramp signal generation circuit 103 generates the ramp signals Rmp1-Rmp4 whose respective timings of starting to linearly increase the potential are shifted by different shift amounts has been described as an example, the present disclosure is not limited thereto. It is sufficient that the ramp signal generation circuit 103 is configured to generate two or more ramp signals whose respective timings of starting to linearly increase the potential are shifted by different shift amounts. In this case, the m data lines D1-Dm are divided into two or more data line groups corresponding to the two or more ramp signals. Then, two or more signal lines on which the two or more respective ramp signals propagate are connected to the two or more respective data line groups via the switch circuit 110.

Embodiment 2

Figure 7:
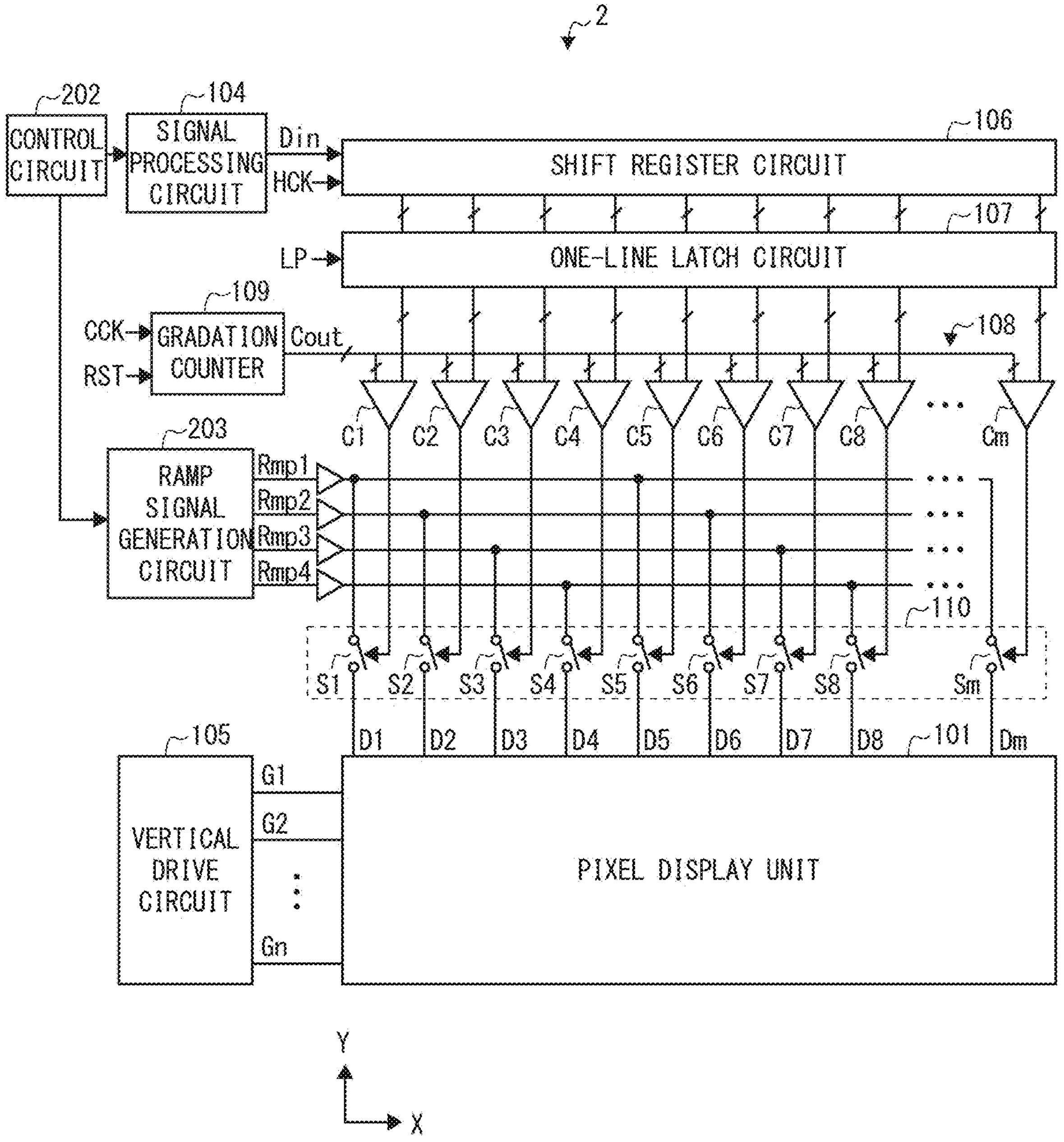
FIG. 7 is a diagram illustrating a configuration example of a liquid crystal display apparatus according to a second embodiment.

FIG. 7 is a diagram illustrating a configuration example of a liquid crystal display apparatus 2 according to a second embodiment. Compared to the liquid crystal display apparatus 1, the liquid crystal display apparatus 2 includes a control circuit 202 instead of the control circuit 102, and includes a ramp signal generation circuit 203 instead of the ramp signal generation circuit 103.

The ramp signal generation circuit 203 generates ramp signals Rmp1-Rmp4 whose potentials at the start of linear increase are shifted by respective different shift amounts. The control circuit 202 controls each of the ramp signal generation circuit 203 and the signal processing circuit 104. For example, the control circuit 202 adjusts the shift amounts of the ramp signals Rmp1-Rmp4 generated by the ramp signal generation circuit 203 and the correction value (additional value) added to each picture signal in the signal processing circuit 104. In this way, the control circuit 202 can cancel the effect of the shift applied to each of the ramp signals Rmp1-Rmp4 by the correction value added to each picture signal. Since the other configurations of the liquid crystal display apparatus 2 are the same as in the case of the liquid crystal display apparatus 1, description thereof is omitted.

(Specific Example of Ramp Signal Generation Circuit 203)

Figure 8:
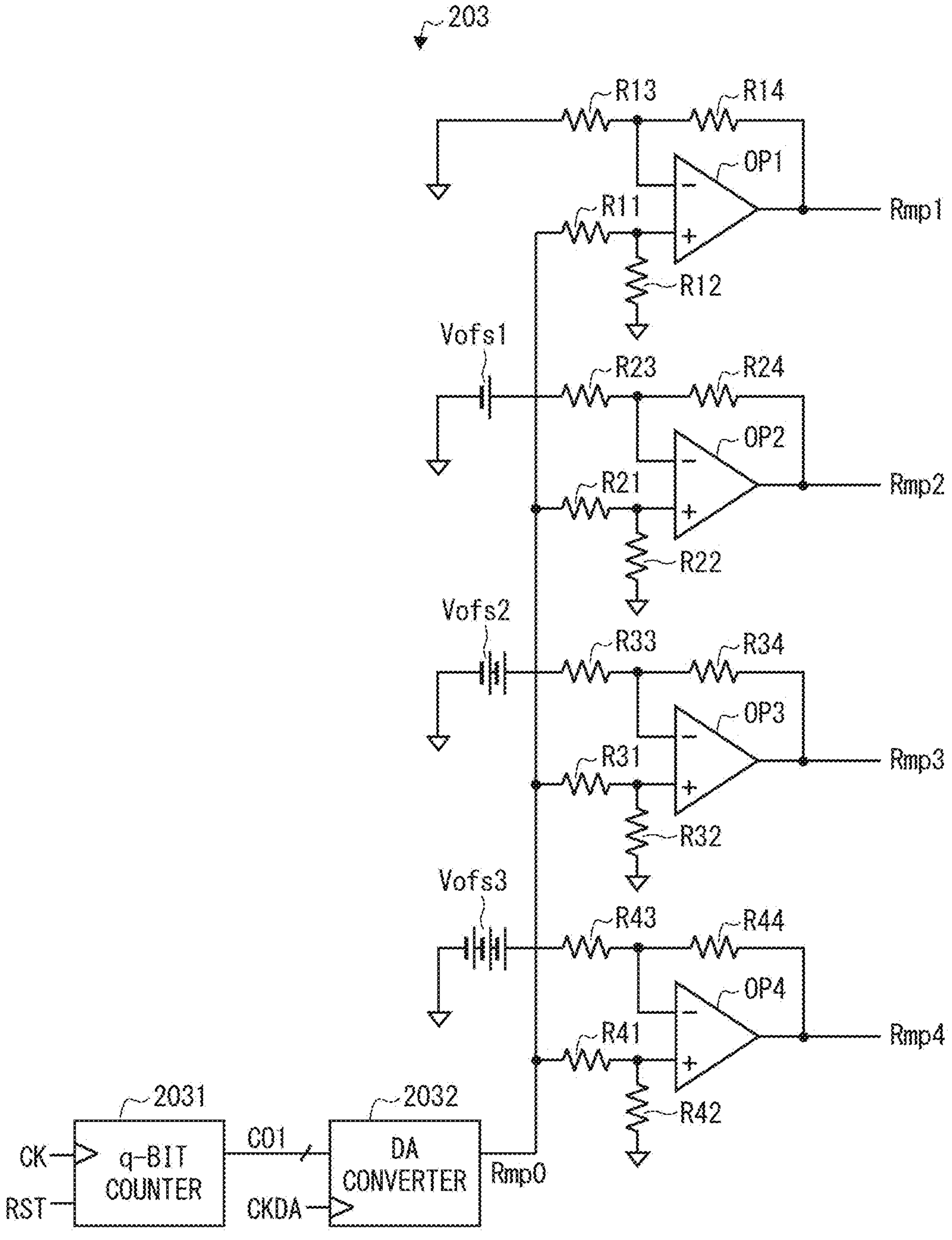
FIG. 8 is a diagram illustrating a specific configuration example of a ramp signal generation circuit provided in the liquid crystal display apparatus shown in FIG. 7.

FIG. 8 is a diagram illustrating a specific configuration example of the ramp signal generation circuit 203. As shown in FIG. 8, the ramp signal generation circuit 203 includes a q-bit counter 2031, a DA converter 2032, operational amplifiers OP1-OP4, resistive elements R11-R14, resistive elements R21-R24, resistive elements R31-R34, resistive elements R41-R44, and voltage sources Vofs1-Vofs3.

The q-bit counter 2031 performs count-up operation of the q-bit count value CO1 in synchronization with the rise of the clock signal CK. Note that the count value CO1 of the q-bit counter 2031 is initialized to "0" in response to the reset signal RST every time one horizontal scanning period has elapsed. In synchronization with the rise of the clock signal CKDA, the DA converter 2032 converts the digital count value CO1 into an analog ramp signal Rmp0 and outputs the analog ramp signal Rmp0.

The resistive element R11 is provided between the output terminal of the DA converter 2032 and the non-inverting input terminal of the operational amplifier OP1. The resistive element R12 is provided between the non-inverting input terminal of the operational amplifier OP1 and a reference voltage supply terminal to which the reference voltage VSS is supplied. The resistive element R13 is provided between the inverting input terminal of the operational amplifier OP1 and the reference voltage supply terminal. The resistive element R14 is provided between the output terminal and the inverting input terminal of the operational amplifier OP1. The output voltage of the operational amplifier OP1 is used as the ramp signal Rmp1. The operational amplifier OP1 and the resistive elements R11-R14 function as a subtraction circuit that subtracts 0 V from the potential of the ramp signal Rmp0 to output the result as the ramp signal Rmp1.

The resistive element R21 is provided between the output terminal of the DA converter 2032 and the non-inverting input terminal of the operational amplifier OP2. The resistive element R22 is provided between the non-inverting input terminal of the operational amplifier OP2 and the reference voltage supply terminal. The resistive element R23 and the voltage source Vofs1 are provided between the inverting input terminal of the operational amplifier OP2 and the reference voltage supply terminal. The voltage source Vofs1 outputs a voltage of Vofs. The resistive element R24 is provided between the output terminal and the inverting input terminal of the operational amplifier OP2. The output voltage of the operational amplifier OP2 is used as the ramp signal Rmp2. The operational amplifier OP2 and the resistive elements R21-R24 function as a subtraction circuit that subtracts a voltage of Vofs from the potential of the ramp signal Rmp0 to output the result as the ramp signal Rmp2.

The resistive element R31 is provided between the output terminal of the DA converter 2032 and the non-inverting input terminal of the operational amplifier OP3. The resistive element R32 is provided between the non-inverting input terminal of the operational amplifier OP3 and the reference voltage supply terminal. The resistive element R33 and the voltage source Vofs2 are provided between the inverting input terminal of the operational amplifier OP3 and the reference voltage supply terminal. The voltage source Vofs2 outputs a voltage of Vofs2 (=Vofs×2). The resistive element R34 is provided between the output terminal and the inverting input terminal of the operational amplifier OP3. The output voltage of the operational amplifier OP3 is used as the ramp signal Rmp3. The operational amplifier OP3 and the resistive elements R31-R34 function as a subtraction circuit that subtracts a voltage of Vofs2 from the potential of the ramp signal Rmp0 to output the result as the ramp signal Rmp3.

The resistive element R41 is provided between the output terminal of the DA converter 2032 and the non-inverting input terminal of the operational amplifier OP4. The resistive element R42 is provided between the non-inverting input terminal of the operational amplifier OP4 and the reference voltage supply terminal. The resistive element R43 and the voltage source Vofs3 are provided between the inverting input terminal of the operational amplifier OP4 and the reference voltage supply terminal. The voltage source Vofs3 outputs a voltage of Vofs3 (=Vofs×3). The resistive element R44 is provided between the output terminal and the inverting input terminal of the operational amplifier OP4. The output voltage of the operational amplifier OP4 is used as the ramp signal Rmp4. The operational amplifier OP4 and the resistive elements R41-R44 function as a subtraction circuit that subtracts a voltage of Vofs3 from the potential of the ramp signal Rmp0 to output the result as the ramp signal Rmp4.

Figure 9:
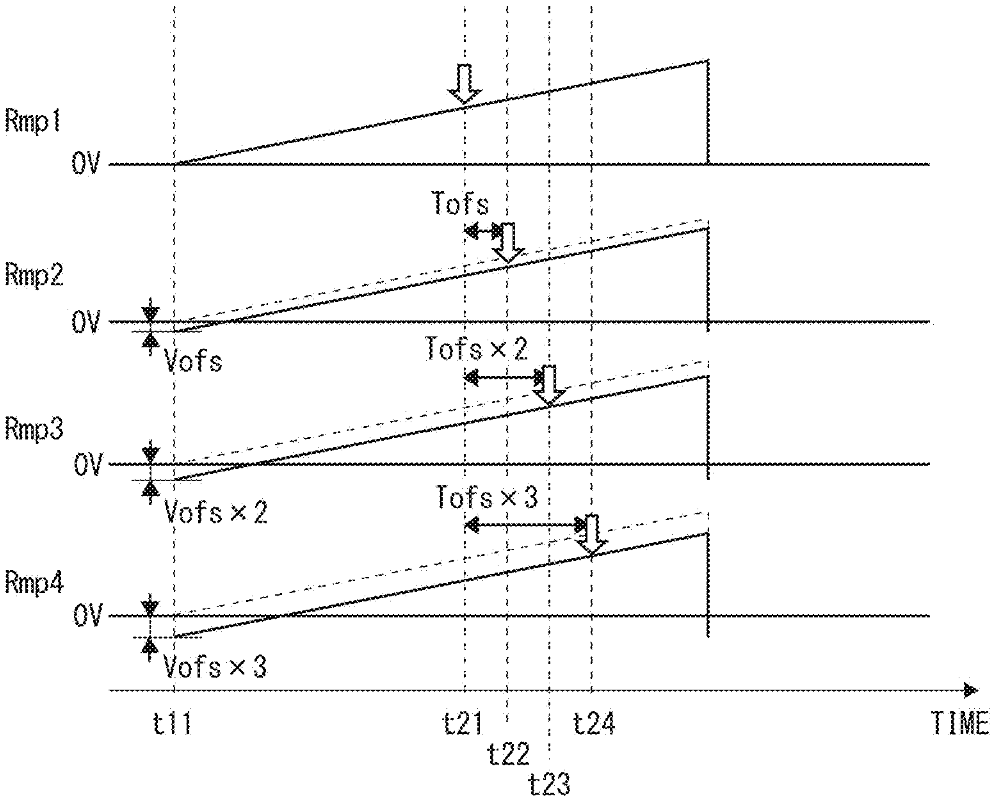
FIG. 9 is a timing chart illustrating a part of operation of the liquid crystal display apparatus shown in FIG. 7.

FIG. 9 is a timing chart illustrating a part of operation of the liquid crystal display apparatus 2. Note that although the example of FIG. 9 assumes that the gradation levels of the picture signals of "d1", "d2", "d3", and "d4" before being processed by the signal processing circuit 104 are the same, the present disclosure is not limited thereto.

As shown in FIG. 9, the potential at the start of linear increase of the ramp signal Rmp2 is shifted to a potential that is lower than the potential at the start of linear increase of the ramp signal Rmp1 by the predetermined voltage of Vofs. Further, the potential at the start of linear increase of the ramp signal Rmp3 is shifted to a potential that is lower than the potential at the start of linear increase of the ramp signal Rmp1 by the predetermined voltage of Vofs2. Furthermore, the potential at the start of linear increase of the ramp signal Rmp4 is shifted to a potential that is lower than the potential at the start of linear increase of the ramp signal Rmp1 by the predetermined voltage of Vofs3.

Here, the time taken for the gradation counter 109 to count the additional value of "k" included in the processed picture signal of "d2+k" is the same as the time of Tofs taken for the ramp signal Rmp2 to return from a potential lower than the reference potential (0 V) by a voltage of Vofs to the reference potential. Therefore, the timing of sampling the ramp signal Rmp2 based on the picture signal of "d2+k" is shifted later than the timing of sampling the ramp signal Rmp1 based on the picture signal of "d1" by the predetermined period of Tofs.

Further, the time taken for the gradation counter 109 to count the additional value of "2k" included in the processed picture signal of "d3+2k" is the same as the time of Tofs2 (=Tofs×2) taken for the ramp signal Rmp3 to return from a potential lower than the reference potential by a voltage of Vofs2 to the reference potential. Therefore, the timing of sampling the ramp signal Rmp3 based on the picture signal of "d3+2k" is shifted later than the timing of sampling the ramp signal Rmp1 based on the picture signal of "d1" by the predetermined period of Tofs2.

Further, the time taken for the gradation counter 109 to count the additional value of "3k" included in the processed picture signal of "d4+3k" is the same as the time of Tofs3 (=Tofs×3) taken for the ramp signal Rmp4 to return from a potential lower than the reference potential by a voltage of Vofs3 to the reference potential. Therefore, the timing of sampling the ramp signal Rmp4 based on the picture signal of "d4+3k" is shifted later than the timing of sampling the ramp signal Rmp1 based on the picture signal of "d1" by the predetermined period of Tofs3.

In this way, the voltage obtained by sampling the ramp signal Rmp1 based on the picture signal of "d1", the voltage obtained by sampling the ramp signal Rmp2 based on the picture signal of "d2+k", the voltage obtained by sampling the ramp signal Rmp3 based on the picture signal of "d3+2k", and the voltage obtained by sampling the ramp signal Rmp4 based on the picture signal of "d4+3k" show the same value.

Thus, since the liquid crystal display apparatus 2 can shift the timings of sampling the ramp signals Rmp1-Rmp4 based on the picture signals of "d1", "d2", "d3", and "d4" with the same gradation level, it is possible to suppress the fluctuation of power supply voltage that occur when the timings of sampling ramp signals based on a plurality of picture signals with the same gradation level are simultaneous.

As described above, since the liquid crystal display apparatus 2 according to this embodiment can shift the timings of sampling ramp signals based on a plurality of picture signals with the same gradation level, it is possible to suppress the fluctuation of power supply voltage that occur when the timings of sampling ramp signals based on a plurality of picture signals with the same gradation level are simultaneous. As a result, the liquid crystal display apparatus 2 according to this embodiment can reduce the deterioration of image quality.

Further, in the liquid crystal display apparatus 2 according to this embodiment, the ramp signal generation circuit 203 can be easily implemented using a pair of a q-bit counter and a DA converter, and four operational amplifiers, so an increase in cost can be suppressed. Note that in this embodiment, a condition may occur in which the sampling timing based on the picture signal to which the additional value is added exceeds the end point of the ramp signal. Therefore, in this embodiment, it is preferable to perform clip processing on the picture signal on the high gradation side so as not to cause timing failure, or to perform level limiting processing on the picture signal by multiplying the picture signal by a gain less than 1.

In this embodiment, although a case where the ramp signal generation circuit 203 generates the ramp signals Rmp1-Rmp4 whose respective potentials at the start of linear increase are shifted by different shift amounts has been described as an example, the present disclosure is not limited thereto. It is sufficient that the ramp signal generation circuit 203 is configured to generate two or more ramp signals whose respective potentials at the start of linear increase are shifted by different shift amounts. In this case, the m data lines D1-Dm are divided into two or more data line groups corresponding to the two or more ramp signals. Then, two or more signal lines on which the two or more respective ramp signals propagate are connected to the two or more respective data line groups via the switch circuit 110.

Note that the present disclosure is not limited to the above embodiments, and can be appropriately modified within a range not departing from the spirit.

Further, in the present disclosure, part or all of the control processing in the liquid crystal display apparatus 1 can be implemented by causing a CPU (Central Processing Unit) to execute a computer program.

The program described above includes a set of instructions (or software codes) for causing a computer to perform one or more of the functions described in the embodiments when loaded into the computer. The program may be stored on a non-transitory computer-readable medium or a tangible storage medium. By way of example but not limitation, computer-readable media or tangible storage media include a RAM (Random-Access Memory), a ROM (Read-Only Memory), a flash memory, an SSD (Solid-State Drive) or other memory technologies, a CD-ROM, a DVD (Digital Versatile Disc), a Blu-ray® disc or other optical disc storages, a magnetic cassette, a magnetic tape, a magnetic disk storage or other magnetic storage devices. The program may be transmitted on a transitory computer-readable medium or communication medium. By way of example but not limitation, transitory computer-readable media or communication media include electrical, optical, acoustic, or other forms of propagation signals.

According to the present disclosure, it is possible to provide a liquid crystal display apparatus capable of reducing the deterioration of image quality and a method for controlling the same.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

The first and second embodiments can be combined as desirable by one of ordinary skill in the art.

Further, part or all of the above embodiments may be described as the following supplementary notes, but are not limited to the following.

(Supplementary Note 1)

A method for controlling a liquid crystal display apparatus, the liquid crystal display apparatus comprising:

an image display unit having a plurality of pixels arranged in a two-dimensional matrix form;

a ramp signal generation circuit configured to output first and second ramp signals whose potentials linearly increase at a horizontal scanning cycle;

a signal processing circuit;

a horizontal shift register configured to sequentially capture a plurality of picture signals for the number of columns of the plurality of pixels processed by the signal processing circuit;

a latch circuit configured to simultaneously output the plurality of picture signals captured by the horizontal shift register;

a gradation counter configured to perform count-up operation at the horizontal scanning cycle;

a plurality of comparators configured to output a matching signal when each of the plurality of picture signals output from the latch circuit matches a count value of the gradation counter; and a switch circuit configured to output, to a pixel in a column corresponding to a comparator from which the matching signal is output among the plurality of comparators, one of voltages of the first ramp signal and the second ramp signal corresponding to the pixel at timing when the matching signal is output, wherein in the ramp signal generation circuit, the first ramp signal and the second ramp signal are shifted by respective different shift amounts, and in the signal processing circuit, a correction value corresponding to a shift amount of the first ramp signal is added to a picture signal corresponding to the first ramp signal, and a correction value corresponding to a shift amount of the second ramp signal is added to a picture signal corresponding to the second ramp signal, among the plurality of picture signals for the number of columns of the plurality of pixels used in one horizontal scanning period.

(Supplementary Note 2)

A control program causing a computer to execute a control process in a liquid crystal display apparatus, the liquid crystal display apparatus comprising:

an image display unit having a plurality of pixels arranged in a two-dimensional matrix form;

a ramp signal generation circuit configured to output first and second ramp signals whose potentials linearly increase at a horizontal scanning cycle;

a signal processing circuit;

a horizontal shift register configured to sequentially capture a plurality of picture signals for the number of columns of the plurality of pixels processed by the signal processing circuit;

a latch circuit configured to simultaneously output the plurality of picture signals captured by the horizontal shift register;

a gradation counter configured to perform count-up operation at the horizontal scanning cycle;

a plurality of comparators configured to output a matching signal when each of the plurality of picture signals output from the latch circuit matches a count value of the gradation counter; and a switch circuit configured to output, to a pixel in a column corresponding to a comparator from which the matching signal is output among the plurality of comparators, one of voltages of the first ramp signal and the second ramp signal corresponding to the pixel at timing when the matching signal is output, wherein the control program causes the computer to execute:

a process of, in the ramp signal generation circuit, shifting the first ramp signal and the second ramp signal by respective different shift amounts; and a process of, in the signal processing circuit, adding a correction value corresponding to a shift amount of the first ramp signal to a picture signal corresponding to the first ramp signal, and adding a correction value corresponding to a shift amount of the second ramp signal to a picture signal corresponding to the second ramp signal, among the plurality of picture signals for the number of columns of the plurality of pixels used in one horizontal scanning period.

What is claimed is:

1. A liquid crystal display apparatus comprising:

an image display unit having a plurality of pixels arranged in a two-dimensional matrix form;

a ramp signal generation circuit configured to shift a first ramp signal and a second ramp signal supplied to a pixel column that is different from a pixel column to which the first ramp signal is supplied, whose potentials linearly increase at a horizontal scanning cycle, by respective different shift amounts, and output the shifted first and second ramp signals;

a signal processing circuit configured to add a correction value corresponding to a shift amount of the first ramp signal to a picture signal in a column corresponding to the first ramp signal, and add a correction value corresponding to a shift amount of the second ramp signal to a picture signal in a column corresponding to the second ramp signal, among a plurality of picture signals for a number of columns of the plurality of pixels used in one horizontal scanning period;

a horizontal shift register configured to sequentially capture the plurality of picture signals processed by the signal processing circuit;

a latch circuit configured to simultaneously output the plurality of picture signals captured by the horizontal shift register;

a gradation counter configured to perform count-up operation at the horizontal scanning cycle;

a plurality of comparators configured to output a matching signal when each of the plurality of picture signals output from the latch circuit matches a count value of the gradation counter; and a switch circuit configured to output, to a pixel in a column corresponding to a comparator from which the matching signal is output among the plurality of comparators, one of voltages of the first ramp signal and the second ramp signal corresponding to the pixel at timing when the matching signal is output.

2. The liquid crystal display apparatus according to claim 1, wherein the ramp signal generation circuit shifts timing of starting to linearly increase potential of each of the first ramp signal and the second ramp signal supplied to the pixel column that is different from the pixel column to which the first ramp signal is supplied by a different shift amount, and outputs the shifted first and second ramp signals.

3. The liquid crystal display apparatus according to claim 1, wherein the ramp signal generation circuit shifts potential at start of linear increase of each of the first ramp signal and the second ramp signal supplied to the pixel column that is different from the pixel column to which the first ramp signal is supplied by a different shift amount, and outputs the shifted first and second ramp signals.

4. A method for controlling a liquid crystal display apparatus, the liquid crystal display apparatus comprising:

an image display unit having a plurality of pixels arranged in a two-dimensional matrix form;

a ramp signal generation circuit configured to output a first ramp signal and a second ramp signal, whose potentials linearly increase at a horizontal scanning cycle;

a signal processing circuit;

a horizontal shift register configured to sequentially capture a plurality of picture signals for a number of columns of the plurality of pixels processed by the signal processing circuit;

a latch circuit configured to simultaneously output the plurality of picture signals captured by the horizontal shift register;

a gradation counter configured to perform count-up operation at the horizontal scanning cycle;

a plurality of comparators configured to output a matching signal when each of the plurality of picture signals output from the latch circuit matches a count value of the gradation counter; and a switch circuit configured to output, to a pixel in a column corresponding to a comparator from which the matching signal is output among the plurality of comparators, one of voltages of the first ramp signal and the second ramp signal corresponding to the pixel at timing when the matching signal is output, wherein in the ramp signal generation circuit, the first ramp signal and the second ramp signal supplied to a pixel column that is different from a pixel column to which the first ramp signal is supplied are shifted by respective different shift amounts, and in the signal processing circuit, a correction value corresponding to a shift amount of the first ramp signal is added to a picture signal in a column corresponding to the first ramp signal, and a correction value corresponding to a shift amount of the second ramp signal is added to a picture signal in a column corresponding to the second ramp signal, among a plurality of picture signals for a number of columns of the plurality of pixels used in one horizontal scanning period.

* * * * *